(12) United States Patent
Pennington et al.

(10) Patent No.: US 8,194,381 B2
(45) Date of Patent: Jun. 5, 2012

(54) ELECTRICAL GROUND TRANSIENT ELIMINATOR ASSEMBLY

(75) Inventors: Donald G. Pennington, La Grange Park, IL (US); John A. Mosier, Jr., Imlay, MI (US)

(73) Assignee: Advanced Integrated Technologies, Imlay City, MI (US)

( * ) Notice: Subject to any disclaimer, the term of this patent is extended or adjusted under 35 U.S.C. 154(b) by 478 days.

(21) Appl. No.: 12/419,297

(22) Filed: Apr. 7, 2009

(65) Prior Publication Data

US 2010/0033889 A1    Feb. 11, 2010

Related U.S. Application Data

(60) Provisional application No. 61/086,753, filed on Aug. 6, 2008.

(51) Int. Cl.
*H02H 3/22* (2006.01)
(52) U.S. Cl. ............. 361/111; 361/42; 361/56; 361/118
(58) Field of Classification Search ........................ None
See application file for complete search history.

(56) References Cited

U.S. PATENT DOCUMENTS

| 5,619,080 | A  | * | 4/1997  | Pennington et al. ......... 307/105 |
| 6,101,079 | A  |   | 8/2000  | Viklund |
| 6,121,765 | A  |   | 9/2000  | Carlson |
| 6,385,029 | B1 |   | 5/2002  | Pennington |
| 6,560,086 | B2 | * | 5/2003  | Mechanic ...................... 361/111 |
| 6,947,266 | B1 | * | 9/2005  | Billingsley ..................... 361/55 |
| 2003/0210104 | A1 |   | 11/2003 | Nir et al. |

* cited by examiner

*Primary Examiner* — Stephen W Jackson
*Assistant Examiner* — Terrence Willoughby
(74) *Attorney, Agent, or Firm* — Davis M. Chin, Jr.; Davis Chin

(57) ABSTRACT

An electrical ground transient eliminator assembly for attenuating high frequency transients and protecting a continuous attenuator circuit of the assembly from overheating due to excessive transients generated on an electrical load is provided. The electrical ground transient eliminator assembly includes a continuous attenuator circuit, which is electrically coupled in parallel to a relay. The assembly includes three lead wires, which are interconnectable to an earth ground line, a neutral line and a load ground of a system that has an electrical load coupled to external AC power lines.

12 Claims, 3 Drawing Sheets

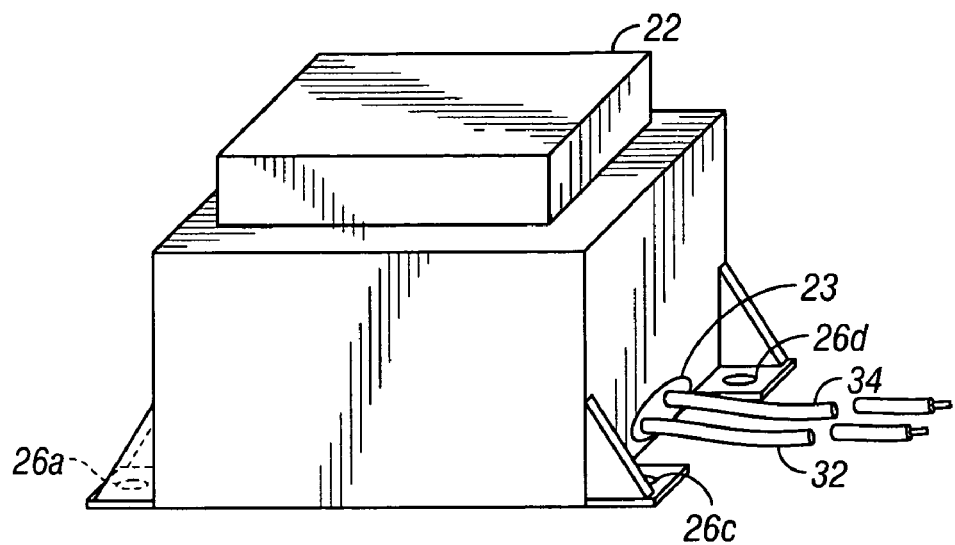
FIG. 4
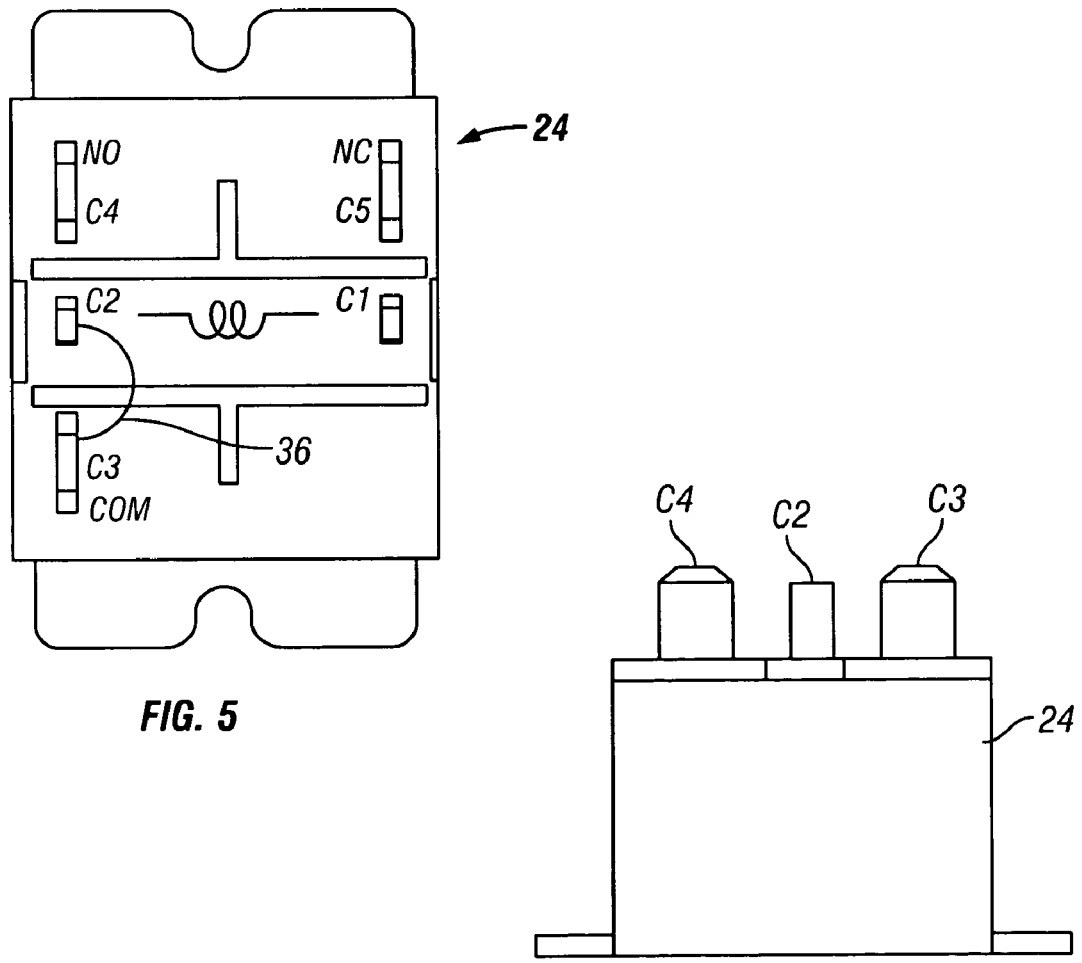
FIG. 5
FIG. 6

ELECTRICAL GROUND TRANSIENT ELIMINATOR ASSEMBLY

CROSS-REFERENCE TO RELATED APPLICATION

This application claims the benefit of U.S. Provisional Application Ser. No. 61/086,753 filed on Aug. 6, 2008, and entitled "Electrical Ground Transient Eliminator Assembly".

BACKGROUND OF THE INVENTION

1. Field of the Invention

This invention relates generally to transient elimination or suppression systems. More particularly, it relates to an electrical ground transient eliminator assembly for attenuating high frequency transients generated on an electrical load reference ground from being passed through to the AC power supply side of a system and for providing a safety relay, which, when energized due to excessive transients generated on the electrical load side of the system, allows the transients to safely bypass the continuous attenuator circuit and pass to earth ground.

2. Description of the Prior Art

In recent decades, much advancement has been made toward increasing the operating speeds of the electrical and electronic circuits within computer systems, cellular telephones and other such modern equipment. Along with the developments made in increasing operating speed, manufacturers have also been able to reduce the physical size of the circuits used in such equipment. In particular, this reduction in size allows manufacturers to add more and more circuits onto a particular integrated circuit chip. As the density of the integrated circuit chip increases with the addition of more circuits, it becomes increasingly more desirable to protect these low voltage chips from high voltage surges, transients, atmospheric discharges (i.e., lightning strikes), and electrical impulses that are induced into building electrical distribution. Other high energy transients may result from any number of other sources, as well, such as inductive or capacitive loads, including motors switching on/off, heat pumps, elevator controls, laser printers, computer disk drives, irrigation systems, solenoids cycling, and even the common telephone lines.

Every building structure, which is up to code, provides a common grounding presence for the many power supplies throughout the building. Particularly, these power supplies use the building electrical ground (earth ground) as a reference point for all of the voltages supplied to the electrical and electronic circuits (CPU, memory, hard disk, modem cards and security systems) in the equipment being used. This earth ground is tied directly to all of the system components for UL safety as well as for internal and external communication. On occasion, however, the earth ground may produce major problems for the equipment because the earth ground has the potential to create a control path for electrical interference which results in equipment damage, system failure and in many circumstances intolerable company "downtime."

Although certain transient eliminator devices have been developed in the prior art to protect against transients generated on the ground wires of sensitive electronic circuits and/or security systems, these devices offer no protection against the overheating of the inductor coils of the transient eliminator device when an accidental short between the "hot" wire and the electrical load reference ground wire occurs at the load side. Because the prior art transient eliminator devices do not protect against this overheating problem, the short created by the accidental coupling of the "hot" wire and the ground wire would cause the fault current to flow in the ground wire, overheat the inductor coils of the transient eliminator device, increase the inductance of the device, which would slow down the reaction time of a circuit breaker in a distribution panel that is coupled to an external AC power source, and ultimately cause a fire.

In U.S. Pat. No. 6,385,029 to Donald G. Pennington issued on May 7, 2002, and entitled "Total Electrical Transient Eliminator", which is assigned to the same assignee as the present invention, there is disclosed an apparatus for attenuating high frequency transients on AC power lines from damaging sensitive electrical and electronic circuits in an electrical load coupled to the AC power line. The AC power line has an earth ground and the electrical load has an electrical load ground. An isolation transformer is provided which has a primary winding and a secondary winding. The primary winding has a primary source lead, a primary neutral lead, and a primary electrostatic shield lead. The secondary winding has a secondary source lead, a secondary neutral lead, and a secondary electrostatic shield lead. The primary source lead, primary neutral lead, and primary electrostatic shield lead are electrically coupled to the AC power lines.

The secondary source lead, secondary neutral lead, and secondary electrostatic shield lead are electrically coupled to the electrical load. The primary electrostatic shield lead and the secondary electrostatic shield lead are electrically connected together and to the earth ground. A continuous attenuator circuit is used to attenuate high frequency transients in the frequency range of 50 kHz to 200 MHz electrically coupled between the earth ground and the electrical load ground. This '029 patent is hereby incorporated by reference in its entirety.

In U.S. Pat. No. 6,121,765 to Carlson issued on Sep. 19, 2000, there is disclosed an isolated electrical power supply. This '765 patent teaches an isolated electrical power supply for protecting electrical devices from transient voltages and currents. A filter is provided which includes a toroid and a resistor which are used in conjunction with an isolator transformer. The filter is coupled between the secondary neutral lead of the transformer and the secondary ground lead so as to shunt the current or voltage spikes. A ferrite bead is connected between earth ground and a binding post for filtering current in the 70-200 KHz range.

In U.S. Pat. No. 6,101,079 to Viklund issued on Aug. 8, 2000, there is disclosed a current and voltage transient protector. The protector module is designed for use with a wiring block having at least one wiring strip. The protector includes an insulative housing having disposed ends. At least four electrically conductive contacts are disposed in the housing. A first fuse is disposed in the housing and is electrically coupled between a first contact and a third contact, while a second fuse, also disposed in the housing, is coupled between a second contact and a fourth contact. An alternative embodiment discloses a first voltage surge suppressor being disposed in the housing and being coupled to a third contact, a second voltage surge suppressor also being disposed in the housing and being coupled to a fourth contact, and a ground contact being coupled to the first and second voltage surge suppressors.

Further, in U.S. Patent Application Publication No. 2003/0210104 to Nir et al. published on Nov. 13, 2003 there is disclosed an electromagnetic interference filter. The filter includes a core, which is mounted on a substrate, having at least one electrically conductive signal lead. The lead is surrounded by a first layer, which is made of glass-coated microwire. A tubular conductive material surrounds the first layer. The substrate is configured as a planar body, which has a top and bottom surface. Portions of the top and bottom surface are covered with electrically conductive material serving as signal and ground terminals and making electrical contact with the tubular conductive material of the core.

It would therefore be desirable to provide an electrical ground transient eliminator assembly, for attenuating high frequency transients generated on an electrical load reference ground from being passed through to the AC power supply side of a system, which includes a safety relay, which, when energized, allows excessive ground fault transients, caused by accidentally shorting a "hot" wire to the electrical load reference ground on the equipment side, to bypass the attenuator circuit of the assembly, pass safely to earth ground and, eventually, trip a circuit breaker located in a distribution panel that is coupled to the AC power supply side. It would also be expedient that the electrical ground transient eliminator assembly be easy to install and is formed of a mechanical package which can fit in a relatively small space.

SUMMARY OF THE INVENTION

Accordingly, it is a general object of the present invention to provide an electrical ground transient eliminator assembly for attenuating high frequency transients generated on an electrical load reference ground from being passed through to the AC power supply side of a system and to also include a safety relay, which, when energized, allows ground fault transients to bypass the attenuator circuit of the assembly, pass safely to earth ground and, eventually, trip a circuit breaker located in a distribution panel.

It is an object of the present invention to provide an electrical ground transient eliminator assembly for interconnection between an earth ground and an electrical load reference ground for attenuating high frequency transients in the range of 50 kHz to 5 GHz generated on the electrical load reference ground from being passed through to the AC power supply side of a system.

It is another object of the present invention to provide an electrical ground transient eliminator assembly, which is of a relatively simple construction and is easy to install.

It is still another object of the present invention to provide an electrical ground transient eliminator assembly for attenuating high frequency transients which is formed of a compact mechanical package that can fit in a relatively small space.

It is yet still another object of the present invention to provide an electrical ground transient eliminator assembly for attenuating high frequency transients and protecting the continuous attenuator circuit of the assembly, which includes a housing containing a continuous attenuator circuit electrically coupled in parallel to a relay having a normally-open contact, a first lead wire coupled to an earth ground, a second lead wire coupled to a neutral lead line, a third lead wire coupled to an electrical load reference ground.

In a preferred embodiment of the present invention, there is provided an electrical ground transient eliminator assembly for attenuating high frequency transients and protecting the continuous attenuator circuit of the assembly, which includes a housing containing a continuous attenuator circuit electrically coupled in parallel to a relay having a normally-open contact, a first lead wire coupled to an earth ground, a second lead wire coupled to a neutral lead line, a third lead wire coupled to an electrical load reference ground. The continuous attenuator circuit is a tuned inductive filter assembly, which is formed of at least one toroid core. A single continuous strand of wire is wound around a predetermined number of turns around the at least one toroid core.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 4 is a pictorial, perspective view of the circuit housing of the continuous attenuator circuit of the electrical ground transient eliminator assembly of FIG. 3;

FIG. 5 is a representational top view of the safety relay of the electrical ground transient eliminator assembly of FIG. 3;

FIG. 6 is a side view of the safety relay of FIG. 5 constructed in accordance with the principles of the present invention;

DESCRIPTION OF THE PREFERRED EMBODIMENT

Figure 3:
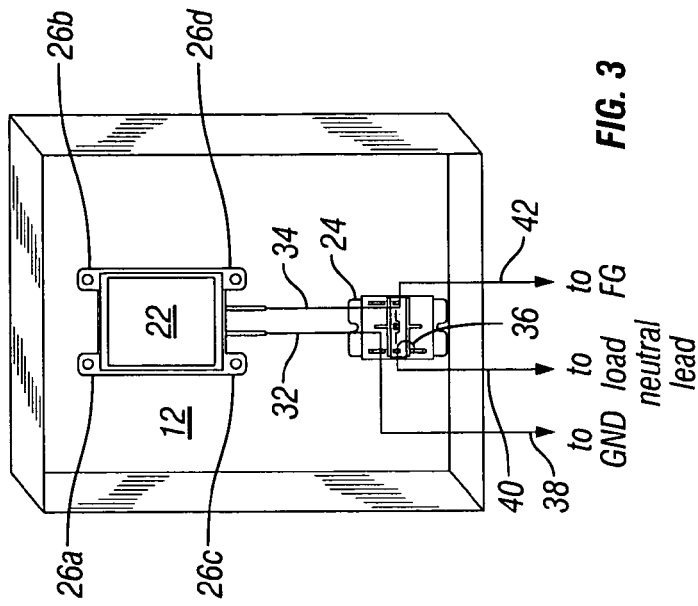
FIG. 3 is a representational perspective view of the inside of the housing of the electrical ground transient eliminator assembly of FIG. 2, illustrating the electrical connections of the continuous attenuator circuit to the safety relay.

It is to be distinctly understood at the outset that the present invention shown in the drawings and described in detail in conjunction with the preferred embodiment of the electrical ground transient eliminator assembly is not intended to serve as a limitation upon the scope or teachings thereof, but is to be considered merely as an exemplification of the principles of the present invention.

Figure 1:
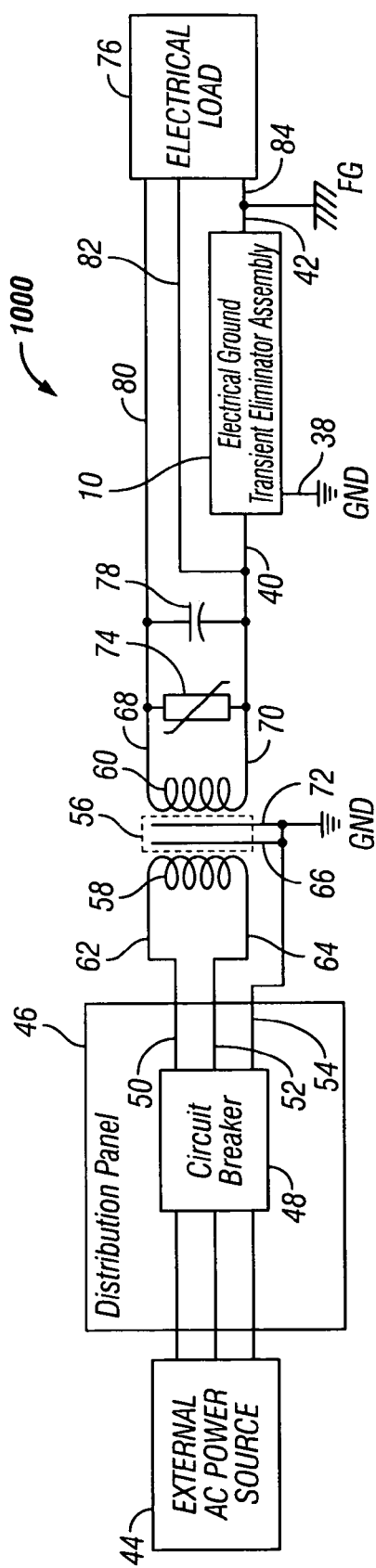
FIG. 1 is a schematic circuit diagram illustrating an application of the electrical ground transient eliminator assembly in accordance with the principles of the present invention.

Referring now in detail to the various views of the drawings, there is shown in FIG. 1 a schematic circuit diagram illustrating an application of the electrical ground transient eliminator assembly 10 within an electrical or electronic system 1000. In accordance with the principles of the present invention, the electrical ground transient eliminator assembly 10 is interconnected to an earth ground, an electrical load reference ground and a neutral load lead of a system. FIG. 1 will be explained in more detail, to better understand the principles of the electrical ground transient eliminator assembly 10 when interconnected to an electrical or electronic system 1000, after the electrical ground transient eliminator assembly 10 is fully described.

Figure 2:
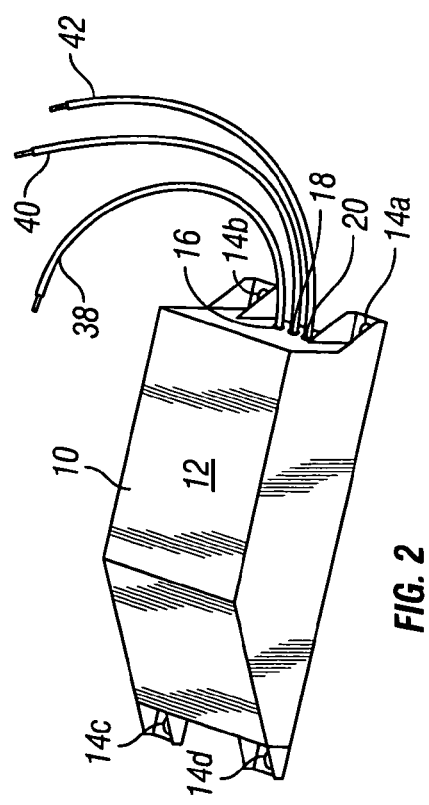
FIG. 2 a pictorial, perspective view of the electrical ground transient eliminator assembly constructed in accordance with the principles of the present invention.

FIG. 2 is a pictorial, perspective view of the electrical ground transient eliminator assembly 10. The assembly housing 12 is formed of a substantially rectangular, black-molded case, which is made of a high impact plastic material such as polypropylene. The assembly housing 12 has a length of about 139.4 mm, a width of about 53.2 mm and a height of about 41 mm. Four mounting feet 14*a*-14*d*, each having an aperture therein, are each separately disposed adjacent to a corresponding one of the four corners of the bottom of the assembly housing 12.

Located at one end of the assembly housing 12 are a first aperture 16, a second aperture 18 and a third aperture 20. As exemplified in FIG. 3 (not drawn to scale), a circuit housing 22 and a safety relay 24 are enclosed within the assembly housing 12.

In particular, the circuit housing 22, as shown in FIGS. 3 and 4, is formed of a substantially cubic-shape, black-molded case which is made of a high impact plastic material such as polypropylene. The circuit housing 22 has a length of about 65 mm (2½ inches), a width of about 55 mm (2⅛ inches), and a height of about 55 mm (2⅛ inches). Four mounting feet 26a-26d, each having an aperture therein, are each separately disposed adjacent to a corresponding one of the four corners of the bottom of the circuit housing 22. A round aperture 23 is located substantially near the bottom of the circuit housing 22.

Figure 8:
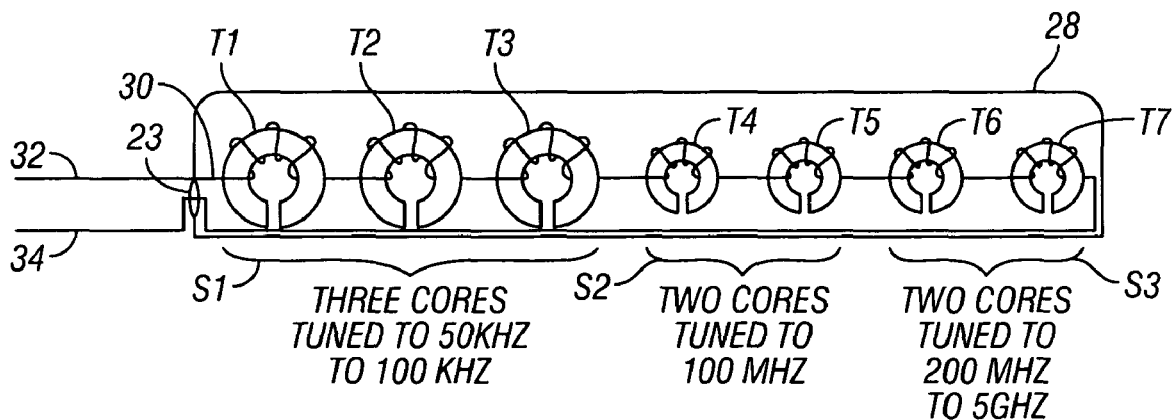
FIG. 8 is a detailed diagram of a plurality of coils as used in the continuous attenuator circuit of FIG. 7 of the preferred embodiment.

Enclosed within the circuit housing 22 is a continuous attenuator circuit 28 (shown in FIG. 8). The continuous attenuator circuit 28, of the preferred embodiment, is designed to attenuate high frequency transients in the range of 50 kHz to 5 GHz that appear on the electrical load reference ground wire before they reach the AC power supply side of a system. It should be apparent to those skilled in the art that the present upper frequency end of 5 GHz is not a limit since the upper frequency end will become higher and higher as the speeds of electronic devices, controls, microprocessors, and semiconductor integrated circuit chips, among other devices, increase in operating speeds.

In the preferred embodiment, the continuous attenuator circuit 28 is a tuned inductive filter assembly. However, it should be noted that any other transient eliminator filter could be used as an alternative to the continuous attenuator circuit 28 of the electrical ground transient eliminator assembly 10. The continuous attenuator circuit 28 is formed of three sections S1-S3. The first section S1 includes three larger series-connected toroids T1-T3, which are tuned to a frequency range between 50 kHz and 100 kHz. The second section S2 includes two smaller series-connected toroids T4-T5, which are tuned to a frequency of about 100 MHz. The third section S3 includes also two smaller series-connected toroids T6-T7, which are tuned to a frequency range between 200 MHz and 5 GHz or higher.

Each of the toroids is formed of a large cylindrical core which is made from iron powder, MMP, or crystalline material. Each of the three larger toroids T1-T3 has an outer diameter dimension of 33 mm (1.44 inches) and an inner diameter dimension of 19.5 mm (0.77 inches). Each of the four smaller toroids T4-T7 is formed of a smaller cylindrical core which is also made from iron powder, MMP, or crystalline material. Each of the four smaller cores has an outer diameter dimension of 20 mm (0.79 inches) and an inner diameter dimension of 12 mm (0.47 inches). It should be understood that the diameter of the cores is dependent upon the magnitude of the high frequency transients to be attenuated or reduced.

While the cores of the toroids are shown to be cylindrical in shape, it should be apparent that other shapes may also be used. Further, the toroids may be of a split ring type. In addition, the number of toroids could be just a single one or more than the seven shown, depending upon the frequency, magnitude, and bandwidth of the high frequency transients to be eliminated. A single long continuous copper strand of magnetic wire 30 is wound continuously and sequentially a predetermined number of turns through each of the seven cores of the toroids which are disposed in close proximity to each other in an end-to-end, side-by-side, or stacked fashion. Each of the three larger cores is preferably wound with 80-140 turns of a No. 18 AWG (American Wire Gauge) and each of the four smaller cores is preferably wound with a single turn.

Referring again to FIG. 8, one end of the copper wire 30 adjacent to the toroid T1 extends through the round opening 23 in the circuit housing 22 and is connected to a lead wire 32. The other end of the copper wire 30 adjacent to the toroid T7 also extends through the same round opening 23 and is connected to a lead wire 34.

As mentioned previously, safety relay 24 is also enclosed within the assembly housing 12. The two views of the relay 24, in FIGS. 5 and 6, may be of the type G4B-112T1, which is manufactured by Omron Electronics, Inc. Specifically shown in FIG. 5, the top surface of safety relay 24 includes five contact terminals C1-C5. C1 and C2 are designated first and second contact terminal, respectively. C3 is designated the "common" contact terminal. C4 is designated the "normally open" contact terminal. C5 is designated the "normally closed" contact terminal and is not used.

FIG. 3 shows the detailed interconnection of the continuous attenuator circuit 28 being electrically coupled in parallel to the safety relay 24, all within a representation of the assembly housing 12. Specifically, one end of lead wire 32 is connected to contact terminal C4 of the relay 24, and as mentioned previously, the other end of lead wire 32 is connected to one end of the copper wire 30 of the continuous attenuator circuit 28. Similarly, one end of lead wire 34 is connected to contact terminal C1 of the relay 24, and as mentioned previously, the other end of lead wire 34 is connected to the other end of the copper wire 30 of the continuous attenuator circuit 28.

Figure 7:
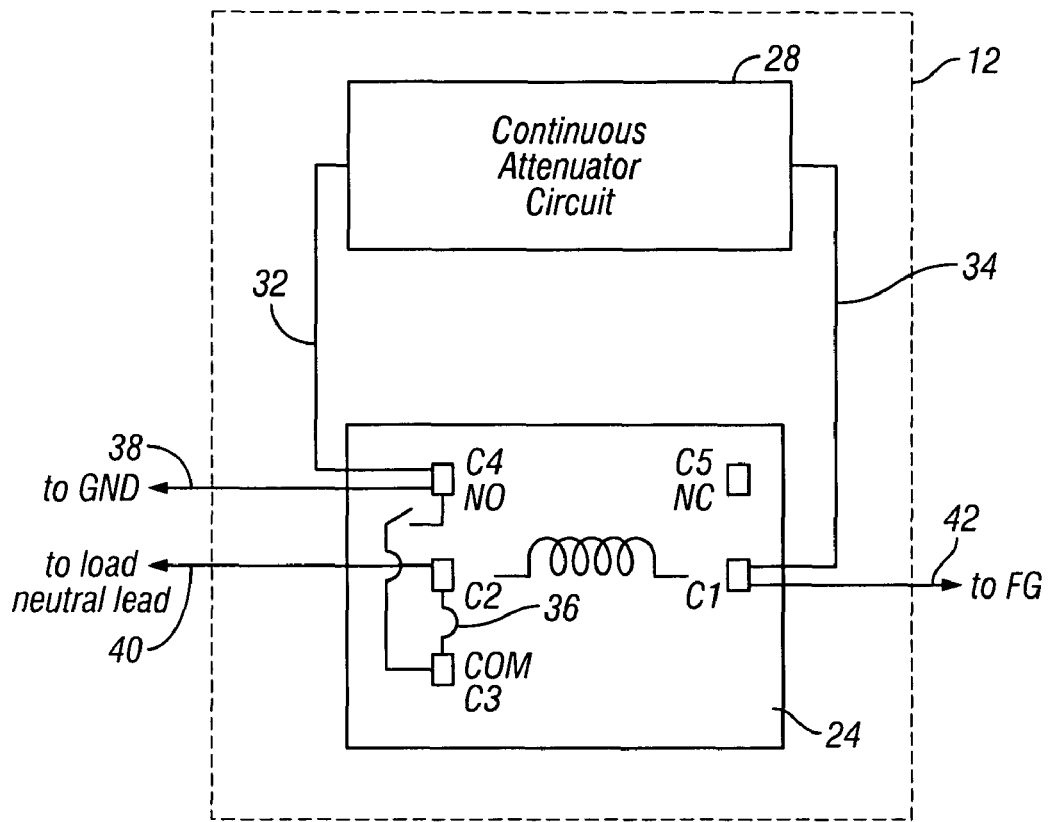
FIG. 7 is a detailed schematic diagram of the electrical ground transient eliminator assembly, of FIG. 3, constructed in accordance with the principles of the present invention.

Further showing in more detail in FIG. 7, a jumper wire 36 connects contact terminal C2 to contact terminal C3. One end of a lead wire 38 is connected to contact terminal C4. The other end of lead wire 38 is fed through aperture 16, of the assembly housing 12, to be connected to an earth ground of an electrical or electronic system, as will be explained below. In a similar fashion, one end of a lead wire 40 is connected to contact terminal C2. The other end of the lead wire 40 is fed through aperture 18, of the assembly housing 12, to be connected to a neutral load lead of an electrical or electronic system. Similarly, one end of a lead wire 42 is connected to contact terminal C1. The other end of the lead wire 42 is fed through aperture 20, of the assembly housing 12, to be connected to an electrical load reference ground of an electrical or electronic system.

As illustrated in FIG. 1, the schematic circuit diagram depicts, in accordance with the present invention, one application of the electrical ground transient eliminator assembly 10 in practice with an electronic or electrical system 1000. The system 1000 includes an external AC power supply 44, which supplies power to a distribution panel 46 (located inside a building). A circuit breaker 48 is electrically coupled to the AC power supply 44 via the distribution panel 46. The circuit breaker 48 has a line lead 50, a neutral lead 52 and an earth ground lead 54.

The system 1000 also includes an isolation transformer 56 having a primary winding 58 and a secondary winding 60, with the primary-to-secondary winding ratio typically being 1:1. The isolation transformer 56 has a primary source lead 62 connected to line lead 50 of the circuit breaker 48, a primary neutral lead 64 connected to neutral lead 52 of the circuit breaker 48, and a primary electrostatic shield lead 66 connected to the earth ground lead 54 of the circuit breaker 48.

The isolation transformer 56 also has a secondary source lead 68, a secondary neutral lead 70 and a secondary electrostatic shield lead 72. The primary electrostatic shield lead 66 and the secondary electrostatic shield lead 72 are connected together and to a primary earth ground lead GND.

A metal oxide varistor (MOV) 74 has one end connected to the secondary source lead 68 of the isolation transformer 56. The other end of the MOV 74 is connected to the secondary neutral lead 70 of the isolation transformer 56. The MOV 74 functions to clamp any high voltages, which may be coupled through the secondary winding 60 of the transformer 56 to the electrical load 76 of the system 1000. A filter capacitor 78 is connected in parallel with the MOV 74 and also has one end connected to the secondary source lead 68 and the other end connected to the secondary neutral lead 70 of the isolation transformer 56. The purpose of the filter capacitor 78 is to attenuate high frequency voltage and current pulses in the 100 kHz frequency range.

In addition, the one end of the capacitor 78, which is connected to the secondary source lead 68, is also connected to a load source lead 80 of the electrical load 76. The other end of the capacitor 78, which is connected to the secondary neutral lead 70, is also connected to a load neutral lead 82 of the electrical load 76. An electrical load ground lead 84 of the electrical load 76 is joined to a floating ground FG.

In order to attenuate high frequency ground fault transients generated at the electrical load 76 from being passed straight back to the primary winding 58 of the transformer 56, and to protect the continuous attenuator circuit 28 from overheating in the case of an accidental shorting of a "hot" wire to the electrical load ground lead 84 of the electrical load 76, the electrical ground transient eliminator assembly 10 of the present invention is interconnected to the system 1000. Specifically, the end of lead wire 38, which is fed through aperture 16 of the assembly housing 12, is connected to the primary earth ground lead GND; the end of the lead wire 40, which is fed through aperture 18 of the assembly housing 12, is connected to the secondary neutral lead 70 and the load neutral lead 82 of the electrical load 76; and the end of the lead wire 42, which is fed through aperture 20 of the assembly housing 12, is connected to the electrical load ground lead 84 of the electrical load 76 and to the electrical load reference ground or floating ground FG.

As best explained in conjunction with FIGS. 1 and 7, once the electrical ground transient eliminator assembly 10 is properly connected to the system 1000, the electrical ground transient eliminator assembly 10 will attenuate high frequency ground fault transients generated at the electrical load 76 from being passed straight back to the primary winding 58 of the transformer 56. Any transients generated from the electrical load 76 during normal operation will pass through on the line 42 and the contact C1 of the relay 24 through the attenuator circuit 28, the line 32, the normally-open contact C4, and the line 38 to the earth ground GND, thereby preventing any transients from reaching the AC power supply side.

On the other hand, if excessive transients are generated at the electrical load 76 due to, for example, an accidental shorting of a "hot" wire to the electrical load ground lead 84, the relay 24 of the electrical ground transient eliminator assembly 10 will become energized and cause the "normally-open" contact C4 to close so that the transients will bypass the continuous attenuator circuit 28, allow the transient to trip the circuit breaker 48 and, thereby, prevent the external AC power supply source from providing power to the electrical load 76.

In this case, the excessive transients generated from the electrical load 76 will now be passed through the contact C1, the relay coil, and the contact C2 to the neutral lead 40. As a result, the relay 24 will become energized so to cause the normally-open contact C4 to close. Then, the excessive transients will bypass the attenuator circuit 28 and pass through the relay 24, the contact C2, the jumper wire 36, common contact C3, the normally-open contact C4 and the line 38 to GND, thereby avoiding overheating of the attenuator circuit 28. When the transient is removed from the system 1000, the circuit breaker 48 will be closed again and the relay 24 will be reset in order to allow the electrical ground fault transient eliminator assembly 10 to continue suppressing transients, which may be generated on the electrical load reference ground or floating ground FG.

From the foregoing detailed description, it can thus be seen that the present invention provides an electrical ground transient eliminator assembly, which attenuates high frequency transients generated at an electrical load from being passed to the AC power supply side of an electrical or electronic system, and to protect the continuous attenuator circuit of the assembly from overheating in the case of an accidental shorting of a "hot" wire to an electrical load ground lead of the electrical load. Thus, the present invention achieves an important goal of preventing potential fires, due to the overheating of the continuous attenuator circuit in the event of an accidental shorting of a "hot" wire and the electrical load ground lead, from occurring.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

The invention claimed is:

1. An electrical ground transient eliminator assembly for attenuating high frequency transients and preventing overheating, of said assembly, due to excessive transients generated on an electrical load side of an electrical system, said assembly comprising:

housing means having a first end and a second end;

attenuator means for attenuating high frequency transients being disposed in said housing;

relay means for allowing excessive transients generated on said electrical load side of said electrical system to bypass, and to prevent overheating of, said continuous attenuator means;

said relay means also being disposed in said housing and electrically coupled in parallel to said continuous attenuator means;

said relay means including a first lead wire, a second lead wire and a third lead wire;

said first lead wire extending from said housing and being connectable to an earth ground of said electrical system;

said second lead wire extending from said housing and being connectable to a neutral load lead of said electrical system; and said third lead wire extending from said housing and being connectable to an electrical load reference ground of said electrical system.

2. An electrical ground transient eliminator assembly as claimed in claim 1, wherein said attenuator means is formed of a tuned inductive filter means being formed of at least one toroid core and a single continuous strand of wire being wound around a predetermined number of turns around said at least one toroid core, said strand of wire having a first end and a second end coupled to said relay means.

3. An electrical ground transient eliminator assembly as claimed in claim 1, wherein said relay means is of the type G4B-112T1, which is manufactured by Omron Electronics, Inc.

4. An electrical ground transient eliminator assembly as claimed in claim 2, wherein said tuned inductive filter means is housed in a black-molded housing, which is made of a high impact plastic material.

5. An electrical ground transient eliminator assembly as claimed in claim 2, wherein said tuned inductive filter means is formed of seven toroid cores and said strand of wire is wound continuously and sequentially a predetermined number of turns around each of said seven toroid cores.

6. An electrical ground transient eliminator assembly as claimed in claim 2, wherein a first three of seven toroid cores are tuned to a frequency range between 50 kHz and 100 kHz, a second two of said seven toroid cores are tuned to a frequency of 100 MHz, and a third two of said seven toroid cores are tuned to a frequency range of between 200 MHz and 5 GHz or higher.

7. An electrical ground transient eliminator assembly as claimed in claim 2, wherein said first three of said seven toroid cores are made larger and are wound with 80-140 turns of a No. 18 AWG size and said second two and said third two of said seven toroid cores are made smaller and are wound with a single turn of the No. 18 AWG size.

8. A method for preventing overheating, due to excessive transients generated on an electrical load side of an electrical system, of a continuous attenuator circuit means for attenuating high frequency transients from damaging sensitive electrical and electronic circuits in an electrical load, which is coupled to an AC power line, said method comprising the steps of:
   coupling electrically in parallel said continuous attenuator circuit means to a relay having a normally-open contact;
   coupling electrically said normally-open contact of said relay to an earth ground of said AC power line, a neutral lead of said electrical load and a load ground of said electrical load; and
   switching said normally-open contact of said relay to a closed position to allow excessive transients generated on said electrical load ground of said electrical load to bypass said continuous attenuator means in order to prevent said continuous attenuator means from overheating, while also tripping a circuit breaker in order to shut down power to the electrical load.

9. A method as claimed in claim 8, wherein said relay is of the type G4B-112T1, which is manufactured by Omron Electronics, Inc.

10. A method as claimed in claim 8, wherein said attenuator means is formed of a tuned inductive filter means being formed of at least one toroid core and a single continuous strand of wire being wound around a predetermined number of turns around said at least one toroid core, said strand of wire having a first end and a second end coupled to said relay means.

11. A method device as claimed in claim 10, wherein said tuned inductive filter means is formed of seven toroid cores and said strand of wire is wound continuously and sequentially a predetermined number of turns around each of said seven toroid cores.

12. A method as claimed in claim 10, wherein a first three of seven toroid cores are tuned to a frequency range between 50 kHz and 100 kHz, a second two of said seven toroid cores are tuned to a frequency of 100 MHz, and a third two of said seven toroid cores are tuned to a frequency range of between 200 MHz and 5 GHz or higher.

* * * * *